United States Patent [19]

Collogan et al.

[11] 4,180,133
[45] Dec. 25, 1979

[54] GUIDANCE SYSTEM FOR TOWED VEHICLES

[75] Inventors: Thomas J. Collogan, Greenfield, Wis.; David C. Boeding, Princeton; Michael P. Hermanson, Story City, both of Iowa; Stanley P. Wellman, Bakersfield, Calif.

[73] Assignee: Iowa State University Research Foundation, Inc., Ames, Iowa

[21] Appl. No.: 869,007

[22] Filed: Jan. 12, 1978

[51] Int. Cl.$^2$ .............................................. A01B 69/00
[52] U.S. Cl. ...................................... 172/26; 172/324; 172/679; 280/468; 280/476 R
[58] Field of Search .................. 172/5, 6, 23, 26, 126, 172/130, 278, 281, 324, 430, 446, 447, 476, 477, 679; 280/446 R, 446 A, 462, 463, 467, 468, 475, 476 R; 180/79, 131; 104/244.1; 239/180, 184

[56] References Cited

U.S. PATENT DOCUMENTS

| | | | |
|---|---|---|---|
| 2,316,397 | 4/1943 | Briscoe | 280/463 |
| 2,622,891 | 12/1952 | Knapp | 280/476 R |
| 2,788,227 | 4/1957 | Wallace | 280/475 |
| 3,391,663 | 7/1968 | Cagle et al. | 280/476 R X |
| 3,537,531 | 11/1970 | Fischer et al. | 172/26 |
| 3,603,405 | 9/1971 | Arnold et al. | 172/26 |
| 3,765,501 | 10/1973 | Burvee | 180/131 |

FOREIGN PATENT DOCUMENTS

| | | | |
|---|---|---|---|
| 2617461 | 11/1976 | Fed. Rep. of Germany | 280/467 |
| 838272 | 6/1960 | United Kingdom | 280/87.2 |
| 854827 | 11/1960 | United Kingdom | 172/26 |
| 1483581 | 8/1977 | United Kingdom | 172/430 |

Primary Examiner—Richard T. Stouffer
Attorney, Agent, or Firm—Zarley, McKee, Thomte, Voorhees & Sease

[57] ABSTRACT

An automatic guidance system for towed vehicles is disclosed comprising a marker, a position sensor, an electronic operational amplifier circuit, an electrical servo controlled hydraulic valve, and a hydraulically controlled swinging draw bar hitch. The position sensor comprises a follower to follow the furrow mark in the ground made by the marker on the preceding pass of the farm implement over the ground and variable resistors mounted on the followers electrically connected to the amplifier circuit. The electrical servo controlled hydraulic valve is driven by the operational amplifier circuit in response to the varying output voltages received from the variable resistors responding to the position of the follower. The position of the towed implement relative to the furrow mark is adjusted by the action of the hydraulically controlled swinging draw bar responding to the operation of the electrical servo controlled hydraulic valve. Deviation of the towed implement from its desired position relative to the furrow mark is detected by the position sensor and corrected by the movement of the hydraulically controlled swinging draw bar responding to the variable resistor outputs of the position sensor via the operational amplifier circuit and electrical servo controlled hydraulic valve. An adjustment apparatus is provided to enable the operator to change the angular displacement of the follower necessary to actuate the electrical servo controlled hydraulic valve, thereby allowing various degrees of implement positioning error. A control switch is provided to allow manual regulation of the servo controlled hydraulic valve and thereby manually control the swinging draw bar to position the implement.

18 Claims, 7 Drawing Figures

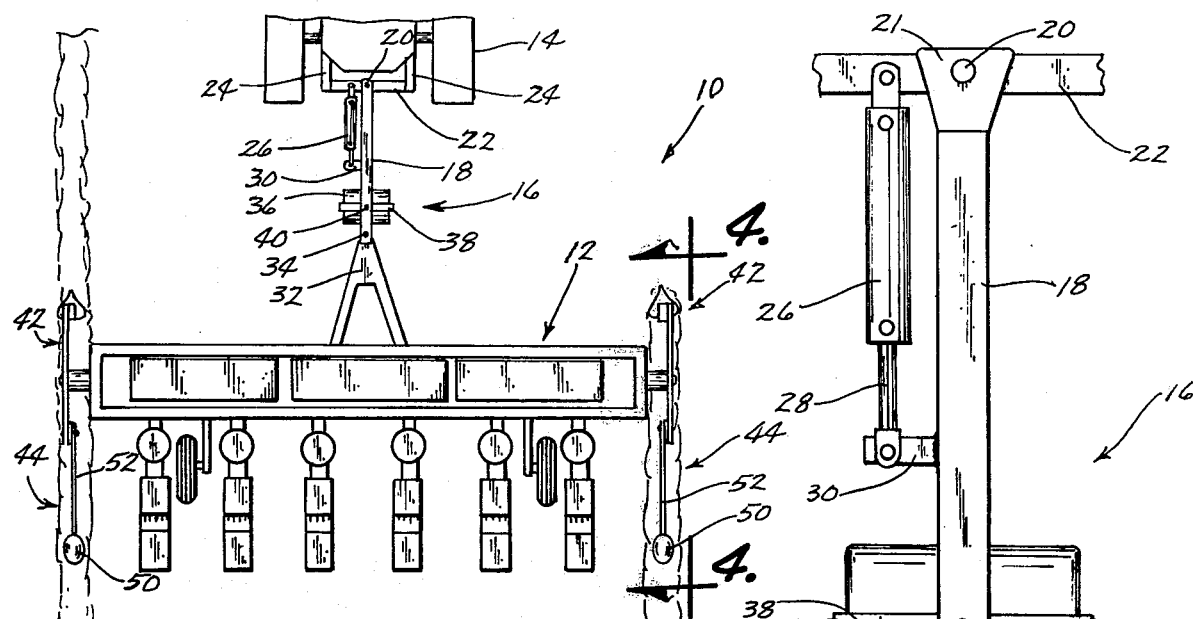
Fig. 1
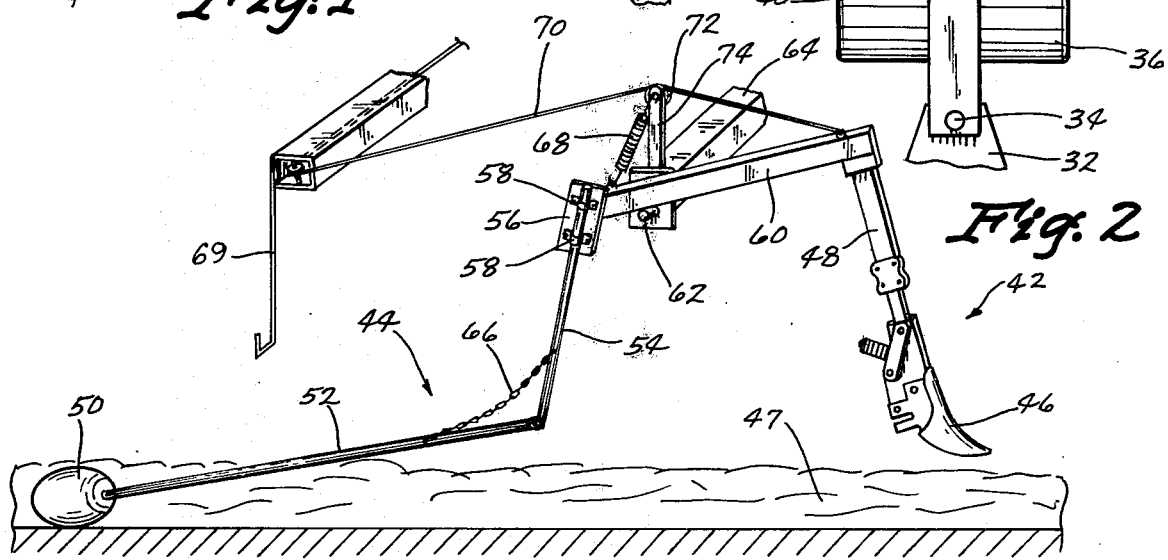
Fig. 2
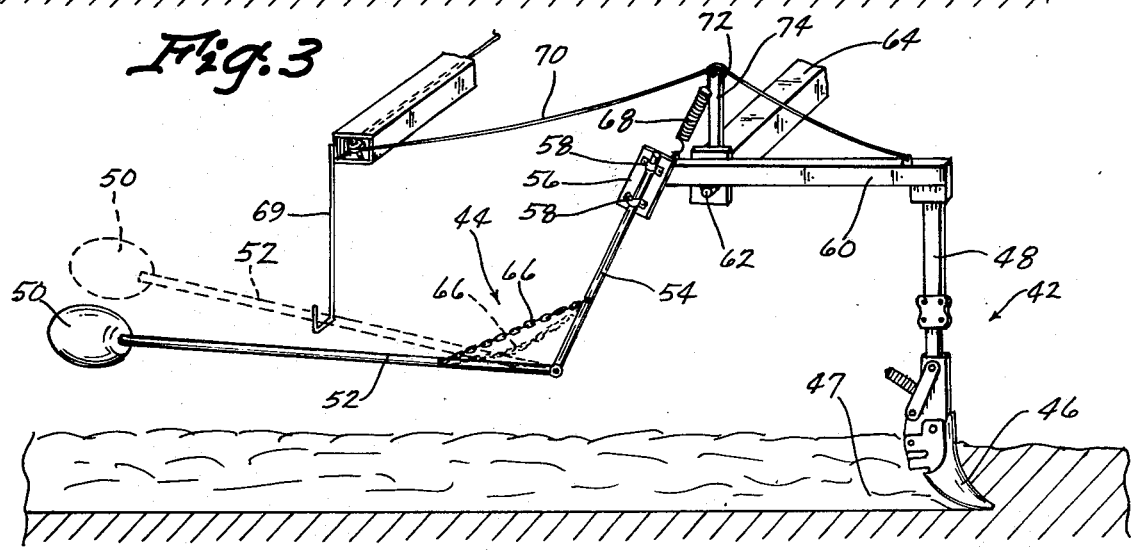
Fig. 3
Fig. 4

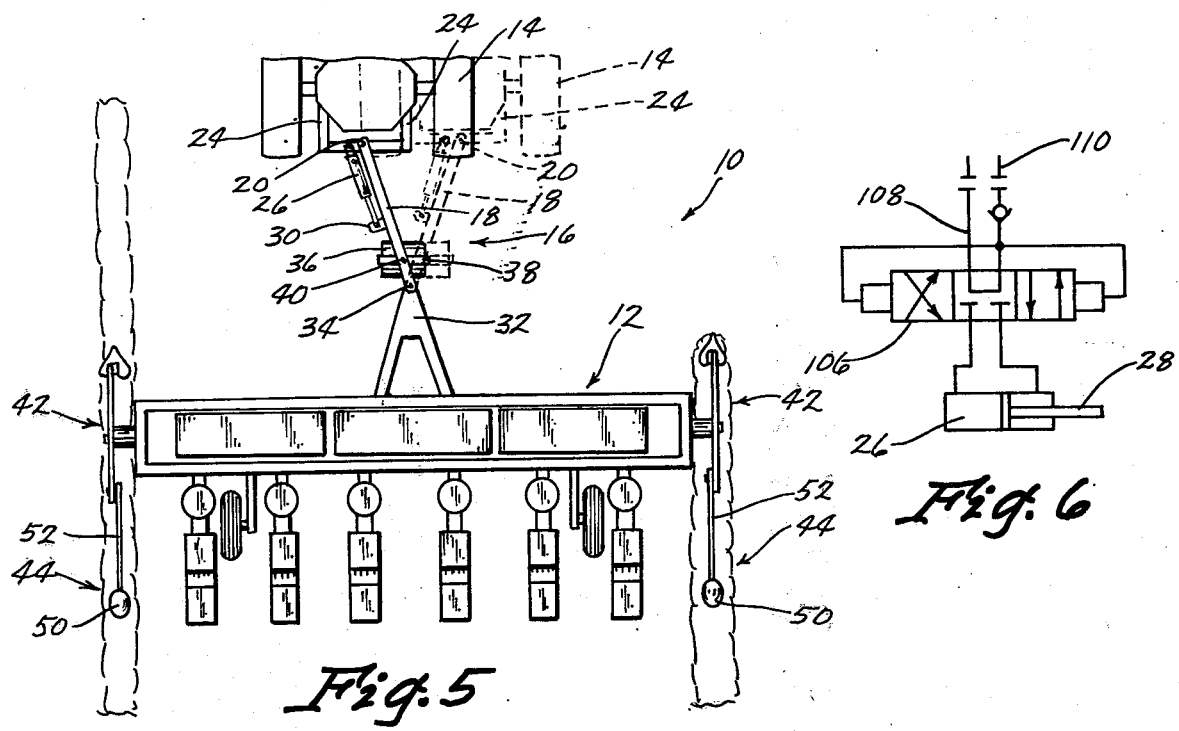
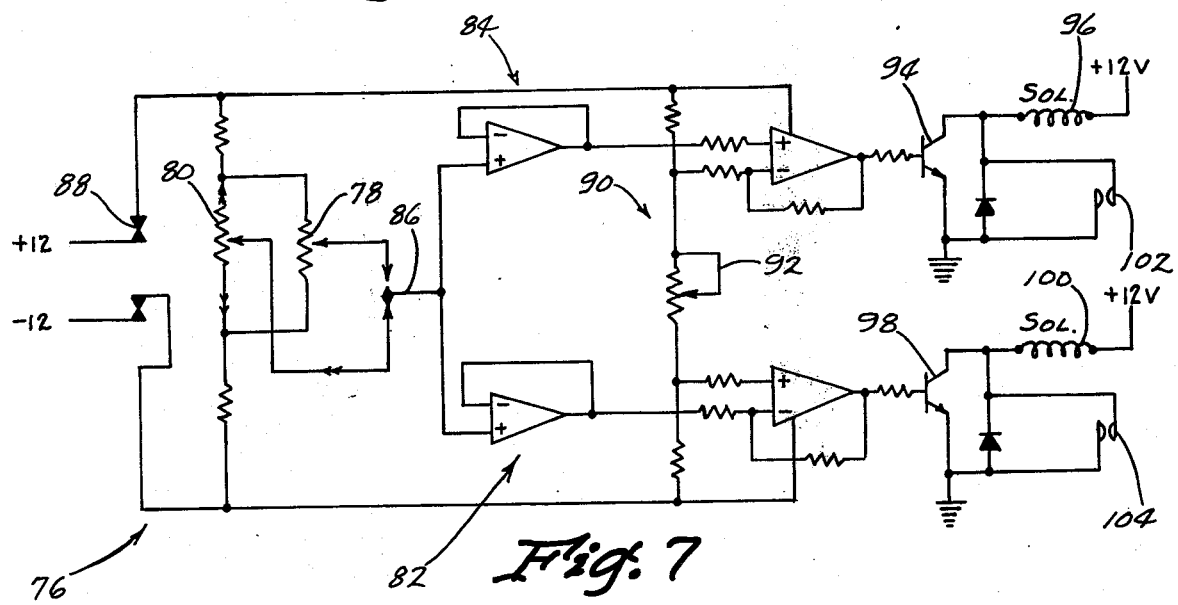

4,180,133

GUIDANCE SYSTEM FOR TOWED VEHICLES

BACKGROUND OF THE INVENTION

This invention relates to a guidance system for towed vehicles and more particularly to an automatic guidance system for a towed farm implement.

The increase of the average farm size has resulted in the use of larger farm equipment. The guidance of this wider equipment while in the field can have considerable effect upon the machine's effective field capacity and thus its field efficiency. Some agricultural operations require extreme guidance accuracy due to various reasons. A common example concerns applications of herbicide. If two "passes" lap over one another possible damage to the crop may result, while if a strip is completely missed, no weed control will be present. Row crop planters also require a high degree of accurate guidance for efficient operation. The markers on a 24 row planter with a 30 inch row spacing are in the vicinity of 30 feet in length. These markers often require one joint to enable the marker to fold, and sometimes two such joints are used. Markers of such length are cumbersome and unwieldy to maneuver.

Many methods of guidance have been utilized and have been generally directed to the guidance of the tractor rather than the guidance of the towed implement. One method involved an operator at a remote location in the field and controlling the tractor by radio control. Another method comprised infrared detectors positioned at the ends of the field which would locate the machine's position by referencing to hot tractor gases. Still other methods involve an electric cable buried in a field with a magnetic follower able to follow the cable down the field, and the utilization of light, radar or infrared beams in which the machine would run between two of these sending units. All of these systems were costly and involved numerous pieces of complex mechanical and electrical sensors and mechanisms. Also to control the location of the towed implement by guidance of the tractor is cumbersome, inaccurate and not as responsive as guidance of the towed implement alone.

Previous guidance systems were not versatile to allow the farmer to use various sizes of equipment for planting, cultivating and harvesting and lacked spacing accuracy to enable exact placement of rows year after year to fully utilize any fertilizer or herbicide that may be banded.

SUMMARY OF THE INVENTION

An automatic guidance system for a towed implement is disclosed comprising a marker, a position sensor, an operational amplifier circuit, an electrical servo controlled hydraulic valve and a hydraulically controlled swinging draw bar hitch. Hydraulic force on the swinging draw bar hitch adjusts the position of the towed implement through the electrical servo controlled hydraulic valve responding to outputs of the operational amplifier circuit. The position sensor comprises a follower to follow the furrow produced by the marker on the previous pass of the implement and variable resistors on the follower to provide informational input voltages to the operational amplifier circuit relative to the displacement of the follower. The guidance system is generally located on the towed implement to guide the towed implement and allows the tractor and the towed implement to operate more or less independently. Adjustment means enable the operator to change the angular displacement necessary to actuate the solenoid valves thereby providing adjustment of the implement positioning error. Control means are also provided to allow manual operation of the solenoid valves and therefore manual control of the position of the towed implement.

It is a principal object of the invention to provide a guidance system for towed implements that guides the implement rather than the tractor pulling the implement.

A further object of the invention is to provide a guidance system for towed implements that is adaptable to various sizes of equipment for planting, cultivating and harvesting.

A still further object of the invention is to provide an improved guidance system for towed implements.

A still further object of the invention is to provide an accurate guidance system for towed vehicles to enable exact placement of rows year after year.

A still further object of the invention is to provide a guidance system for towed vehicles that operates more or less within the existing boundary of the implement.

A still further object of the invention is to provide a guidance system for towed vehicles reducing the precision of operation required by the operator to lessen fatigue upon the operator and increase the feasibility of night time operation.

A still further object of the invention is to provide a guidance system for towed implements utilizing a marker of reduced length to alleviate transportation problems due to low clearance of bridges, wire, etc. and to improve safety by reducing the number of pinch points on the marker.

A still further object of the invention is to provide a guidance system for towed vehicles that is economical to manufacture, durable in use, and refined in appearance.

BRIEF DESCRIPTION OF THE DRAWINGS

This invention consists in the construction, arrangements, and combination of the various parts of the device, whereby the objects contemplated are attained as hereinafter more fully set forth, specifically pointed out in the claims, and illustrated in the accompanying drawings in which FIG. 1 is a top plan view of the invention mounted on a farm implement towed by a tractor.

FIG. 2 is an enlarged top plan view of the swinging draw bar hitch.

FIG. 3 is an enlarged side view of the marker and position sensor.

FIG. 4 is an enlarged side view similar to FIG. 3 seen on line 4—4 of FIG. 1.

FIG. 5 is a top plan view similar to FIG. 1 illustrating the operation of the hitch.

FIG. 6 is a schematic view of the servo controlled hydraulic valve.

FIG. 7 is an electrical schematic view of the electrical circuit.

DESCRIPTION OF THE PREFERRED EMBODIMENT

The numeral 10 generally refers to the guidance system for a towed implement shown mounted to a planter 12 being towed by a tractor 14 as shown in FIG. 1.

Hitch 16 connects tractor 14 and planter 12. Attachment to the tractor 14 is accomplished by swinging draw bar 18 being pivotally mounted about pin 20 through clevis 21 affixed to the cross bar 22 connecting the lower links 24 of a conventional three-point hitch. Hydraulic cylinder 26 is pivotally mounted at one end to cross bar 22 with the outer end of arm 28 of hydraulic cylinder 26 pivotally mounted to brace 30 transversely extending from draw bar 18. Extension and contraction of arm 28 thereby produces pivotal movement of draw bar 18 about pin 20. Draw bar 18 is pivotally attached to tongue 32 of planter 12 by pivot pin 34. Gauge wheel 36 is rotatably mounted to fork 38 which in turn is pivotally attached to draw bar 18 by pin 40 just forward of hitch point 34. Gauge wheel 36 insulates planter 12 from the vertical tractor motion and provides a smooth consistent ride for planter 12.

A marker 42 and a position sensor 44 are located on each side of planter 12 as far forward as possible to minimize the reaction time and still not interfere with clearance for turning. Marker 42 is comprised of a standard cultivator sweep 46 mounted on a standard cultivator shank 48. Utilization of a standard cultivator sweep and shank allows the marker to trip when striking immovable objects. Position sensor 44 comprises spheroid shaped follower 50 attached to follower shaft 52 which is pivotally attached to sensing shaft 54 as shown in FIG. 3. Revolving sensing shaft 54 is bearing mounted to mounting plate 56 by bearing mounts 58. Connection bar 60 pivots on pin 62 projecting from front tool bar 64 of planter 12 and is securely connected at one end to mounting plate 56 and at the other end to shank 48. Sensing shaft 54 is mounted at approximately a 60° angle to connection bar 60 so that when the mechanism is in the following mode, the revolving sensing shaft 54 will be approximately vertical (FIG. 3). When the mechanism is in the marking mode and the follower 50 is in the up position, sensing shaft 54 will be at approximately a 30° angle from the vertical (FIG. 4). Stop 66 is connected at one end to sensing shaft 54 and at the other end to follower shaft 52, and allows for lift of follower shaft 52 as the mechanism shifts from a following to a marking mode. During road travel, follower shaft 52 is held in stirrup 69 as shown in FIG. 4. A marker 42 position sensor 44 combination is located on each side of planter 12 (FIG. 1) and during operation one side will be in the marking position while the other side is in the following position. At the end of a pass across the field, the planter is raised and turned around and on the return pass, follower 50 will be down to follow the furrow made by cultivator sweep 46 on the previous pass while the cultivator sweep on the side opposite the following operation is making another furrow for the next pass. Spring 68 provides a force against connection bar 60 so that when the tension in cable 70 is relaxed, marker 42 will pivot to a marking mode (FIG. 4). To raise marker 42 and lower position sensor 44 into a following mode, the tension in cable 70 is increased causing connection bar 60 to pivot about pin 62 as shown in FIG. 3. Cable 70 is attached at one end to connection bar 60 directly above shank 48 and extends over pully 72 rotatably mounted to upstanding post 74 mounted to front tool bar 64 directly above pivot pin 62. Cable 70 terminates in a control box (not shown) for controlling the amount of tension in cable 70 and for alternating the marker 42-position sensor 44 combinations as previously described.

Electronic control circuit 76 is schematically shown in FIG. 7 and controls the action of hydraulic cylinder 26 in response to an error in the position of the planter. Variable resistors 78 and 80 are mounted on the shafts 54 located on each side of the planter and provide the inputs to operational amplifiers 82 and 84. Variable resistor 78 is located on the left shaft 54 and variable resistor 80 is located on the right shaft 54.

The selection of variable resistor 80 or variable resistor 78, depending on which side of the planter is sensing position, is made by selector switch 86. In FIG. 7, selector switch 86 is shown in a "right" position activating the variable resistor on the right side of planter 12. Variable resistor 78 and 80 are operationally connected to shafts 54 such that any deviation of planter 12 from its predetermined alignment relative to the furrows is converted proportionately to voltage outputs from variable resistors 78 and 80 ranging from +12 volts to −12 volts D.C. The positive voltage is obtained from the tractor battery (not shown) and the negative voltage is obtained from an extra battery pack (not shown). Switch 88 connects and disconnects the battery power sources to electrical circuit 76. The output voltage from either resistor 78 or resistor 80 is fed into operational amplifiers 82 and 84. Operational amplifier 84 is a non-inverting amplifier while operational amplifier 82 is an inverting amplifier. A reference voltage is supplied by deadband circuit branch 90 which contains variable resistor 92 to allow variance of the reference voltage. Operational amplifiers 82 and 84 compare the voltages coming from deadband branch 90 and either variable resistor 78 or 80. Operational amplifier 84 is a non-inverting amplifier and has a positive output when its input is positive. Operational amplifier 82 is an inverting amplifier and has a positive output when its input is negative. For example, with the selector switch 86 activating variable resistor 80, the output from resistor 80 is being fed into operational amplifiers 82 and 84. When the voltage coming from variable resistor 80 to operational amplifier 84 is higher than the voltage from the deadband branch 90, the signal from operational amplifier 84 is positive. This positive signal turns on transistor 94 and current flows to solenoid 96. Since the voltage from variable resistor 80 is higher than the voltage from deadband branch 90, operational amplifier 82 converts this positive signal resulting in a negative output. Because of this negative output, transistor 98 does not conduct and therefore no current flows to solenoid 100. When the output voltage from variable resistor 80 is low, resulting in a negative input signal when compared to the deadband reference voltage across branch 90, operational amplifier 82 inverts this negative input signal into a positive output signal, thereby causing transistor 98 to conduct current to solenoid 100. At the same time, the negative input signal to operational amplifier 84 results in a negative output signal to transistor 94 since operational amplifier 84 is a non-inverting amplifier resulting in no conduction of current from transistor 94 to solenoid 96. Switch 102 provides for manual activation of solenoid 96 and switch 104 provides manual activation of solenoid 100 when electronic circuit 76 is deactivated.

Solenoids 96 and 100 are incorporated within electrical servo controlled hydraulic valve 106 as shown in FIG. 6. Hydraulic feed line 108 and return line 110 connect the remote outlet of the tractor hydraulic system and hydraulic cylinder 26 via valve 106. The position of valve 106 as shown in FIG. 6 maintains arm 28 in a stationary position. Activation of solenoid 96 as hereinbefore described will cause the direction of flow into cylinder 26 to be such as to extend arm 28 while the activation of solenoid 100 will reverse the flow so as to withdraw arm 28. Arm 28 in turn applies force through brace 30 to draw bar 18 thereby adjusting the position of planter 12 (FIG. 5). Thus, any deviation in position of planter 12 as detected by follower 50 results in a correcting force being applied to draw bar 18 thereby guiding planter 12.

Variable resistor 92 in deadband circuit branch 90 enables the operator to change the angular displacement necessary to actuate solenoid valve 106. This adjustment will be a compromise between exact control of the planter 12 and stability. If the deadband is too small, the planter will jog back and forth rapidly while traveling down the field while a wide deadband would allow large row spacing error.

In operation, during the first pass of the planter 12, one of the markers 42 is in a lowered position (FIG. 4) so that cultivator sweep 46 makes a furrow 47 in the earth. The operator then turns the planter around at the headlands, and aligns the appropriate follower 50 in furrow 47. The marker 42 on the side of the planter 12 opposite to the lowered follower 50 will thereby be positioned so as to make a furrow for the next pass. As the tractor and planter proceed down the field, the lowered follower 50 riding in the furrow, will detect any deviation of position of planter 12 and such deviation will be corrected via electronic circuit 76, servo controlled hydraulic valve 106, hydraulic cylinder 26, and swinging draw bar 18 realigning planter 12. At the end of the pass, the tractor and planter are turned around and the process is repeated with the relative operational modes on each side of the planter being reversed. Switch 86 provides activation of the variable resistor for the appropriate follower side. Switches 102 and 104 provide manual control of the system to aid the operator in getting the follower into the furrow after making the turn and going around obstacles during operation.

Thus, it can be seen that guidance system 10 accomplishes at least all of its stated objectives.

What is claimed is:

1. In combination, a towed farm implement having first and second opposite sides with a tool bar extending therebetween and a tongue structure extending forwardly from said tool bar, and
    a guidance system for said implement comprising,
    a compensating hitch means pivotally secured at its rearward end to the forward end of said tongue structure and adapted to be connected at its forward end to the lower links of a three-point hitch of a prime mover,
    control means for selectively adjusting the position of said hitch means with respect to the lower links of a three-point hitch of a prime mover to which it is attached,
    means for marking a furrow in the ground as said implement is towed, said marking means extending from said sides of said implement,
    a follower extending from said implement to be operationally engaged by said furrow so that said implement is a predetermined distance from said furrow,
    detecting means operatively connecting to said follower for electrically detecting the deviation of said implement from said predetermined distance from said furrow, and
    an electronic circuit means electrically connecting said control means to said detecting means so that a predetermined deviation of said implement from said predetermined distance from said furrow activates said control means to adjust the position of said hitch means to align said implement at said predetermined distance from said furrow.

2. The combination of claim 1 wherein said compensating hitch means comprises,
    a swinging drawbar having forward and rearward ends, said forward end pivotally attached to a crossbar connecting said lower links of the three-point hitch of said prime mover and said rearward end pivotally attached to said tongue structure, and
    a hydraulic cylinder and arm pivotally connected at one end to said crossbar connecting said lower links of the three-point hitch of said prime mover and pivotally connected at the other end to said swinging drawbar so that extension of said cylinder arm pivots said swinging drawbar in one direction relative to said prime mover and retraction of said cylinder arm pivots said swinging drawbar in the other direction relative to said prime mover thereby altering the direction of travel of said implement.

3. The combination of claim 2 wherein said control means comprises an electrical servo controlled valve operationally attached to said hydraulic cylinder so that said arm may be selectively extended and retracted.

4. The combination of claim 3 wherein said servo controlled valve contains first and second solenoids such that electrical activation of said first solenoid causes said arm to extend and electrical activation of said second solenoid causes said arm to retract.

5. The combination of claim 2 wherein a gauge wheel means is pivotally mounted to said swinging drawbar for engagement with the ground to insulate said implement from the vertical motion of said prime mover, said gauge wheel means being located just forward of the pivotal connection to said tongue structure.

6. The combination of claim 1 wherein said follower comprises,
    a spheroid follower member of generally elliptical shape to be contained and guided by the walls of said furrow,
    a first elongated member having first and second ends, said first end attached to said spheroid follower member, and
    a second elongated member rotatably attached at one end to said implement and pivotally attached at the other end to said second end of said first member such that said second member rotates when said implement strays from said predetermined distance from said furrow guiding said follower member.

7. The combination of claim 6 wherein said detecting means comprises a variable resistor operationally attached to said second elongated member so that the rotation of said second member proportionately changes the resistance value of said variable resistor.

8. The combination of claim 1 wherein said electronic circuit comprises,
    a first non-inverting operational amplifier, said first amplifier producing a positive output from a positive input,
    a second inverting operational amplifier, said second amplifier producing a positive output from a negative input, said second amplifier operationally connected to said first amplifier with an adjustable deadband voltage reference means interconnected therebetween, a first switch means electrically connected to said first amplifier such that a positive output from said first amplifier activates said switch means, a second switch means electrically connected to said second amplifier such that a positive output from said second amplifier activates said switch means, and a power supply electrically connected to said first and second amplifiers and said detecting means such that a voltage output from said detecting means higher that said deadband reference voltage produces a positive output from said first amplifier thereby activating said first switch means and a voltage output from said detecting means lower than said deadband reference voltage produces a positive output from said second amplifier thereby activating said second switch means, with said first and second switch means electrically connected to said control means.

9. The combination of claim 8 wherein said first and second switch means comprise a manually operated switch means.

10. The device of claim 8 wherein said first and second switch means comprise first and second transistor switches.

11. The combination of claim 1 wherein said marking means and said follower are located on said first and second sides with said marking means on said first side and said follower on said second side operating simultaneously and said marking means on said second side and said follower on said first side operating simultaneously, and said marking means on said first side not operating concurrently with said marking means on said second side.

12. In combination with an implement having a tongue means rigidly connected thereto and extended forwardly therefrom, a compensating hitch means comprising, an elongated swinging drawbar member having frontward and rearward ends and comprising a single rigid element extending from said frontward end to said rearward end, said frontward end adapted for pivotal connection to a prime mover and said rearward end adapted for pivotal connection to said implement, a hydraulic cylinder pivotally connected at one end to said drawbar member and adapted at the other end for pivotal connection to a prime mover, said drawbar member including hydraulic cylinder connecting means rigidly affixed to said rigid element, said one end of said hydraulic cylinder being directly connected to said connecting means such that the extension of the cylinder arm causes said drawbar to pivot in one transverse direction relative to said prime mover and the retraction of said arm causes said drawbar to pivot in the other transverse direction relative to said prime mover, and means for controlling the extension and retraction of said cylinder arm, said tongue means being directly pivotally connected to said rigid element at said rearward end of said elongated swinging drawbar member whereby said tongue means is transversely moved in unison with said rearward end of said elongated swinging drawbar member for direct corrective steering of said implement in response to pivotal movement of said drawbar member.

13. The device of claim 12 wherein a gauge wheel means is pivotally mounted about a vertical axis to said drawbar for engagement with the ground to insulate the towed implement from the vertical motion of said prime mover, said gauge wheel means being located just forward of said rearward end of said drawbar.

14. A field implement comprising, a tool bar, a tongue structure extending forwardly from said tool bar, a compensating hitch means pivotally secured to the forward end of said tongue at its rearward end and adapted to be connected by its forward end to the lower links of a three-point hitch of a prime mover, control means on said compensating hitch for selectively adjusting the position of said hitch with respect to the lower links of the three-point hitch of a prime mover to which it is attached, means on said tool bar for creating a furrow in the direction of travel of said tool bar, guide means on said tool bar adapted to follow in said furrow, and means operatively connecting said guide means and said control means whereby the operation of said control means is influenced by said guide means.

15. The device of claim 14 wherein said control means compries a hydraulic cylinder pivotally attached at one end to said compensating hitch means, and adapted at the other end to be pivotally attached to a crossbar connecting said lower links of the three-point hitch of a prime mover such that extension of the cylinder arm pivots said hitch means in one direction relative to said crossbar and retraction of said arm pivots said hitch means in the other direction relative to said crossbar.

16. The device of claim 15 wherein said control means comprises an electrically activated servo controlled hydraulic valve connecting said hydraulic cylinder to the hydraulic system of a prime mover.

17. The device of claim 15 wherein said guide means comprises, a spheroid follower member of generally elliptical shape to be contained and guided by the walls of a furrow, a first elongated member having first and second ends, said first end attached to said spheroid follower member, and, a second elongated member rotatably attached at one end to said tool bar and pivotally attached at the other end to said second end of said first member such that said second member rotates when said implement deviates from a predetermined distance from said furrow.

18. The device of claim 12 wherein said frontward end of said elongated swinging drawbar member and said other end of said hydraulic cylinder are adapted for pivotal connected to the prime mover at transversely aligned positions thereon to accommodate connection to the crossbar of a three-point hitch of a prime mover.

* * * * *